United States Patent [19]

Kumpf et al.

[11] Patent Number: 5,342,905
[45] Date of Patent: Aug. 30, 1994

[54] PROCESS FOR MAKING AN ESTER CONTAINING POLYETHER SULFONE

[75] Inventors: Robert J. Kumpf, Pittsburgh; Aaron D. Meltzer, Carnegie; Harald Pielartzik, Pittsburgh, all of Pa.

[73] Assignee: Miles Inc., Pittsburgh, Pa.

[21] Appl. No.: 10,736

[22] Filed: Jan. 29, 1993

[51] Int. Cl.⁵ .................. C08G 8/02; C08G 69/32
[52] U.S. Cl. .................. 525/534; 528/173; 528/174
[58] Field of Search .............. 528/173, 174; 525/534

[56] References Cited

U.S. PATENT DOCUMENTS

| | | | |
|---|---|---|---|
| 4,296,217 | 10/1981 | Stuart-Webb | 525/390 |
| 4,358,569 | 11/1982 | Quinn et al. | 525/534 |
| 4,517,354 | 5/1985 | D'Aleolio | 528/172 |
| 4,705,843 | 11/1987 | Stammann et al. | 528/212 |
| 4,999,414 | 3/1991 | Genz et al. | 528/125 |
| 5,047,496 | 9/1991 | Eckel et al. | 528/171 |
| 5,077,350 | 12/1991 | Mullins et al. | 525/394 |
| 5,093,435 | 3/1992 | Harris et al. | 525/534 |
| 5,221,727 | 6/1993 | Kumpf et al. | 528/173 |

FOREIGN PATENT DOCUMENTS 0353478 2/1990 European Pat. Off.
0445409 9/1991 European Pat. Off.

*Primary Examiner*—John C. Bleutge
*Assistant Examiner*—Helen F. Lee
*Attorney, Agent, or Firm*—Joseph C. Gil; Aron Preis

[57] ABSTRACT

A two step process for the preparation of an ester group-containing polyether sulfone is disclosed. In the first step a dihalogenodiphenyl sulfone is reacted with excess amount of an aromatic dihydroxy compound and in a second step the reaction product is reacted with a dicarboxylic acid derivative. The excess amount of the aromatic dihydroxy compound is that amount which is sufficient to react with said derivative to form the corresponding ester. The process of the invention is characterized by its economics and good yield and by the high purity of the product. The thus produced polyether sulfone is useful as a thermoplastic resin and as a reactant in the melt blending process for the preparation of block copolymers.

9 Claims, No Drawings

PROCESS FOR MAKING AN ESTER CONTAINING POLYETHER SULFONE

FIELD OF THE INVENTION

The invention relates to a process for the preparation of sulfones and more particularly to polyether sulfones which contain in their structure an ester group.

SUMMARY OF THE INVENTION

A two step process for the preparation of an ester group-containing polyether sulfone is disclosed. In the first step a dihalogenodiphenyl sulfone is reacted with excess amount of an aromatic dihydroxy compound, and in a second step the reaction product is reacted with a dicarboxylic acid or its derivatives. The excess amount of the aromatic dihydroxy compound is that amount which is sufficient to react with said derivative to form the corresponding ester. The process of the invention is characterized by the good yield and by the high purity of the product. The polyether sulfone is useful as a thermoplastic resin and as a reactant in the melt blending process for the preparation of block copolymers.

BACKGROUND OF THE INVENTION

Aromatic polyethers, including polyether sulfones are known. These resins are characterized by their flame resistance, mechanical properties and their oxidative and dimensional stability at elevated temperatures. It has long been recognized that because of the absence of functional groups from their respective structures polyether and polysulfones are not easily copolymerized. A process for the preparation of block copolymers of polycarbonate and polysulfones has been disclosed in the article Bisphenol-A-Polycarbonate Bisphenol-A-Polysulfone Block Copolymers by James E. McGrath et al in Polymer Engineering and Science August 1977 Vol. 17, No. 8 PP 647. Accordingly, a low molecular weight hydroxy-terminated polysulfone has been first produced by the condensation of excess of the sodium salt of BPA with dichlorodiphenyl sulfone. The oligomer was then dissolved in a mixture of methylene chloride and pyridine. Addition of BPA and phosgene resulted in the formation of a block copolymer. European Patent Application 353,478 disclosed polyether-polycarbonate copolymers and their preparation. The copolymers are prepared by contacting an activated polyaryl ether thioether polymer with a polyaryl carbonate.

In order to facilitate copolymerization it has been proposed to use polyethers which contain functional groups, for instance ester groups. An ester group-containing aromatic polyether has thus been disclosed in European Patent Application 445 409. Accordingly, the preparation of the aromatic polyether is carried out by reacting together in a one step process a diflourobenzophenone, bisphenol-A and an ester bisphenol (EBP). This process has been found to be suitable also where the benzophenone has been replaced by a difluorodiphenyl sulfone (DFDPS). The drawback to this process is the high cost of DFDPS. An attempt to carry out the process with the corresponding chloro compound, dichlorodiphenyl sulfone, was unsuccessful as only low molecular weight product results.

DETAILED DESCRIPTION OF THE INVENTION

A process for the preparation of an ester group-containing polyether sulfone conforming to

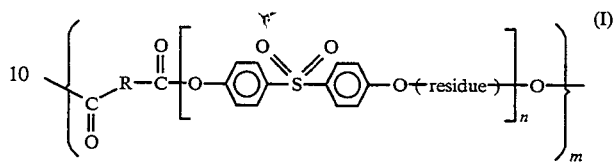

is disclosed. In the above formula, -( residue )- denotes that portion of a dihydroxy compound without its OH groups, and R is an hydrocarbon residue of a carboxylic acid, n is an integer of about 5 to 50, preferably about 10 to 20, and m is an integer of about 2 to 40, preferably 2 to 10.

The polyether sulfone has a number average molecular weight of about 500 to 150,000, preferably about 6000 to 100,000.

The inventive process comprises
(i) reacting a dihalogenodiphenyl sulfone with excess amount of an aromatic dihydroxy compound to form a reaction product, and
(ii) reacting a carboxylic acid or its derivative with the reaction product to produce an ester group-containing polyether sulfone.

The carboxylic acid derivative in the present context is any of dicarboxylic acid halide or the anhydride of such acids, for instance an acid chloride or its anhydride. The amount of dicarboxylic acid halide used is that which is sufficient to react with the excess amount of the aromatic dihydroxy compound and with said reaction product.

The reaction is carried out in the presence of polar solvents at temperatures of 110° to 320° C.

In accordance with the invention the process may be carried out either by purifying the reaction product obtained in (i) and then reacting the purified product with the dicarboxylic acid derivative, for instance terephthaloyl chloride, or by avoiding the purification process in which case the reaction may take place in a single reactor. In this alternative embodiment of the invention care must be taken to make certain that the first step has been completed before adding the reactant, the carboxylic acid or its derivative, in the second step.

The dihalogenodiphenyl sulfone suitable in the process of the invention conforms to

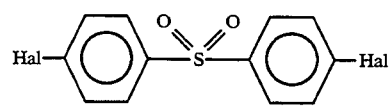

wherein
hal denotes a halogen. The preferred dihalogenodiphenyl sulfone is 4,4'-dichlorodiphenyl sulfone.

The aromatic dihydroxy compound suitable in the process of the invention conforms to formulae (1) or (2).

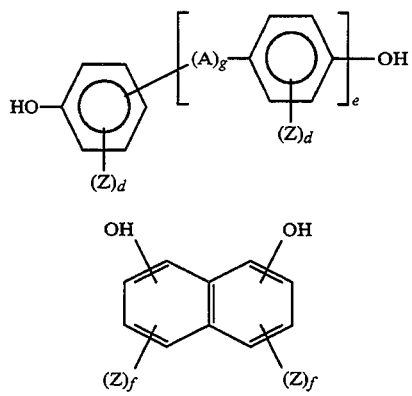

(1)

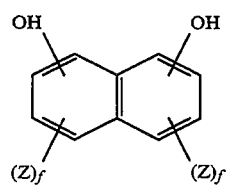

wherein

A denotes an alkylene group with 0 to 8 carbon atoms, an alkylidene group with 2 to 8 carbon atoms, a cycloalkylene or a cycloalkane group with 5 to 15 carbon atoms, a cycloalkylidene group with 5 to 15 carbon atoms, a carbonyl group, an oxygen atom, a sulfur atom, —SO— or —SO$_2$— or a radical conforming to

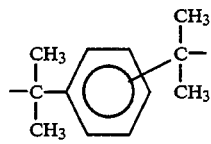

e and g both denote the number 0 to 1;

Z denotes F, Cl, Br or C$_1$-C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, 4,4'-(3,3,5-trimethyl-cyclohexylidene) diphenol, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis(3,5-dimethyl-4-hydroxyphenyl)-propane, bis-(3,5-dimethyl-4-hydroxyphenyl)-sulfide, bis-(3,5-dimethyl-4-hydroxyphenyl)sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The carboxylic acid derivative is preferably derived from an aromatic carboxylic acid halide, preferably a diacid conforming to

Hal—CO—Ar—OC—Hal where Ar is an aromatic radical, most preferably terephthaloyl chloride or isophthaloyl chloride.

In carrying the process according to the invention, the relative molar amounts of the reactants may range as follows: aromatic dihydroxy compound:dihalogenodiphenyl sulfone:carboxylic acid derivative=3:2:1 to 21:19:2.

The first step of the process is carried out in a solvent or a mixture of solvents and in the presence of a base. The solvent is an aprotic polar solvent or its mixture with a second solvent which will form an azeotrope with water. The base, used at an equivalent ratio $\geq 1$ (base to aromatic dihydroxy compound) is an alkali, or alkaline earth, metal hydroxide or the corresponding carbonate. Examples include potassium carbonate, potassium hydroxide, sodium carbonate, sodium bicarbonate and calcium hydroxide.

The second step of the process may be carried out in a solvent or a mixture of solvents. Any aprotic solvent is suitable in the second step of the process particularly aprotic polar solvents.

Although not necessary -especially a hydroxide has been used in the first step - a catalyst may be used in the second step of the process. Tertiary amines, including pyridine, dimethyl pyridine, trialkylamine and triarylamine are among the suitable catalysts.

The polyethers prepared by the process of the invention are suitable for the production of molded articles by thermoplastic procedures including injection molding and extrusion. In addition, the polyethers may be used in the context of block copolymerizing with other thermoplastics, such as polyesters, polycarbonates, polyamides and polyesteramides in extrusion melt blending in a process which is more fully described in the *Encyclopedia of Polymer Science and Engineering*, 2nd Edition, Wiley Interscience, John Wiley and Sons, New York.

The invention is further illustrated but is not intended to be limited by the following examples in which all parts and percentages are by weight unless otherwise specified.

EXAMPLES a) A 500 mL 3-neck flask was loaded with 76.7 gram (0.255 mol) dichlorodiphenyl sulfone, 71.9 gram (0.312 mol) bisphenol A, 49.7 gram (0.36 mol) K$_2$CO$_3$, 200 mL of N-methyl pyrolidinone and 60 mL of toluene. The reaction flask was fitted with a Dean-Stark trap and mechanical stirrer and was heated to 155° C. The reaction mixture was left stirring at 155° C. for about 6 hr, collecting ca. 2 mL of H$_2$O in the trap. The reaction mixture was subsequently heated to 180° C. for 6 hr while distilling off the necessary amount of toluene. After allowing the reaction to cool, 10 mL of acetic acid were added, and the mixture was precipitated into methanol. The reaction mixture was subsequently redissolved in methylene chloride, washed three times with 50 mL of 1N HCl, and three times with distilled water and precipitated into methanol. The structure was verified by IR spectroscopy. About 20 gram of the product thus obtained was dissolved in 100 mL N-methyl pyrolidinone. Triethylamine (0.5 mL) and terephthaloyl chloride (0.63 gram) were added and the reaction mixture was stirred for 60 min. The solution was diluted with methylene chloride, and precipitated into methanol. The chain elongation was confirmed by IR and GPC. The number average molecular weight of the product was 14,000.

b) A 500 mL 3-neck flask was loaded with 29.4 gram (0.102 mol) dichlorodiphenyl sulfone, 28.5 gram (0.125 mol) bisphenol A, 19.7 gram (0.21 mol) $K_2CO_3$, 200 mL of N-methyl pyrolidinone and 60 mL of toluene. The reaction flask was fitted with a Dean-Stark trap and mechanical stirrer and was heated to 155° C. The reaction mixture was left stirring at 155° C. for about 6 hr, collecting $H_2O$ in the trap. The reaction mixture was subsequently heated to 180° C. for 6 hr while distilling off the necessary amount of toluene. After allowing the reaction mixture to cool, terephthaloyl chloride (4.7 gram, 0.02 mol) and triethylamine (10 mL) were added. The reaction mixture was subsequently precipitated into methanol, redissolved in methylene chloride, washed three times with 50 mL of 1N HCl, and three times with distilled water and precipitated into methanol. The structure was verified by IR, specifically to the carbonyl band at 1725 cm$^{-1}$. (Molecular weight of the product, $M_n$ 26,000).

c) A 500 mL 3-neck flask was loaded with 29.4 gram (0.102 mol) dichlorodiphenyl sulfone, 28.5 gram (0.125 mol) bisphenol A, 19.7 gram (0.21 mol) $K_2CO_3$, 240 mL of N-methyl pyrolidinone and 290 mL of chlorobenzene. The reaction flask was fitted with a Dean-Stark trap and mechanical stirrer and was heated to 155° C. The reaction mixture was left stirring at 155° C. for about 6 hr, collecting $H_2O$ in the trap. The reaction mixture was subsequently heated to 180° C. for 6 hr while distilling off the necessary amount of chlorobenzene. After allowing the reaction mixture to cool, terephthaloyl chloride (4.7 gram, 0.02 mol) and triethylamine (10 mL) were added. The reaction mixture was subsequently precipitated into methanol, redissolved in methylene chloride, washed three times with 50 mL of 1N HCl, and three times with distilled water and precipitated into methanol. The structure was verified by IR, specifically to the carbonyl band at 1725 cm$^{-1}$. (Molecular weight of the product, $M_n$ 12,500).

d) A 500 mL 3-neck flask was loaded with 91.2 gram (0.40 mol) bisphenol A, 240 mL of N-methyl pyrolidinone and 290 mL of chlorobenzene. The reaction flask was fitted with a Dean-Stark trap and mechanical stirrer. NaOH (70.9 mL, 45.2 wt%) was slowly added as the reaction mixture was heated to 115° C. The reaction mixture was left stirring at 140° C. for about 4 hr as the water was collected in the trap. Dichlorodiphenyl sulfone, 93.8 gram (0.33 mol) was slowly added to the reaction, and solvent was slowly distilled off until the pot temperature reached 175° C. This temperature was maintained for 6 hr. After allowing the reaction mixture to cool, terephthaloyl chloride (17.2 gram, 0.07 mol) and triethylamine (14.5 mL, 0.145 mol) were added. The reaction mixture was subsequently precipitated into methanol, redissolved in methylene chloride, washed three times with 50 mL of 1N HCl, three times with distilled water and precipitated into methanol. The structure was verified by In, specifically to the carbonyl band at 1725 cm$^{-1}$. (Molecular weight of the product, $M_n$ 16,000).

e) A comparative example: the procedure outlined in European Patent Application 445,409 has been followed as follows: dichlorodiphenyl sulfone (14.36 gram; 0.05 mole), EBP (0.552 gram; 0.0024 mol), and BPA (10.87 gram; 0.0576 mol) were reacted. The resulting polyether was determined to have an intrinsic viscosity of about 0.15 which compared to the corresponding viscosity of the product made in accordance with the present invention, that is greater than 0.5, is indicative of low molecular weight.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a high molecular weight ester group-containing polyether sulfone conforming to

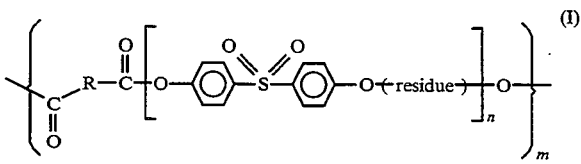

wherein
R is a hydrocarbon residue of a carboxylic acid, n is an integer of about 5 to 50 and m is an integer of about 2 to 40, comprising
(i) reacting a dihalogenodiphenyl sulfone conforming to

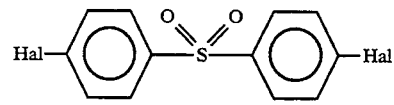

wherein
hal denotes a halogen, with excess amount of an aromatic dihydroxy compound conforming to formulae (1) or (2)

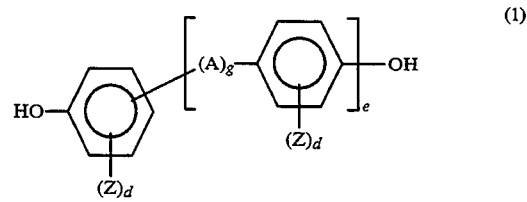

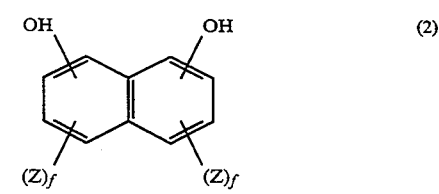

wherein

A denotes an alkylene group with 1 to 8 carbon atoms, an alkylidene group with 2 to 8 atoms, a cycloalkylene group with 5 to 15 carbon atoms, a cycloalkylidene group with 5 to 15 carbon atoms, a carbonyl group, an oxygen atom, a sulfur atom or —SO— or a radical conforming to

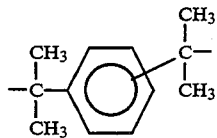

e and g both denote the number 0 to 1;
Z denoted F, CL, Br or $C_1$-$C_4$-alkyl and if several Z radicals are substituents in one aryl radical, they may be identical or different from one another;
d denotes an integer of from 0 to 4; and
f denotes an integer of from 0 to 3,
and in the presence of a base to produce a product, and
(ii) reacting the product of said (i) with a dicarboxylic acid or its derivative to produce an ester group-containing polyether sulfone, said excess amount being sufficient to react with said acid or its derivative to form the corresponding ester, said molecular weight being about 10,000 to 40,000.

2. The process of claim 1 wherein said n is about 10 to 20.

3. The process of claim 1 wherein said m is about 2 to 10.

4. The process of claim 1 wherein said carboxylic acid derivative is terephthaloyl chloride.

5. The process of claim 1 wherein said dihalogenodiphenyl sulfone is dichlorodiphenyl sulfone.

6. The process of claim 1 wherein said dihydroxy compound is selected from the group consisting of hydroquinone, resorcinol, bis-(hydroxyphenyl)-alkanes, bis-(hydroxyphenyl)ethers, bis-(hydroxyphenyl)-ketones, bis-(hydroxyphenyl)sulfoxides, bis-(hydroxyphenyl)-sulfides, and α,α-bis-(hydroxyphenyl)-diisopropyl-benzenes, as well as their nuclear-alkylated compounds.

7. The process of claim 1 wherein said dihydroxy compound is at least one member selected from the group consisting of 2,2-bis-(4-hydroxyphenyl)-propane (bisphenol A), 2,4-bis(4-hydroxyphenyl)-2-methylbutane, 1,1-bis-(4-hydroxyphenyl)cyclohexane, 1,1-bis-(4-hydroxyphenyl)-isophorone, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, dihydroxybenzophenone, 2,4-bis-(3,5-dimethyl-4-hydroxyphenyl)-cyclohexane and α,α'-bis-(3,5-dimethyl-4-hydroxyphenyl)-p-diisopropylbenzene.

8. The process of claim 1 wherein said dihydroxy compound is selected from the group consisting of 2,2,-bis-(4-hydroxyphenyl)-propane, 2,2-bis-(3,5-dimethyl-4-hydroxyphenyl)-propane, 1,1-bis-(4-hydroxyphenyl)-cyclohexane and 4,4'-(3,3,5-trimethylcyclohexylidene) diphenol.

9. A process for the preparation of a high molecular weight ester group-containing polyether sulfone conforming to

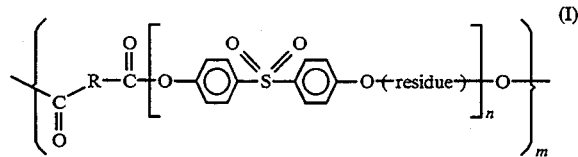

wherein
R is an hydrocarbon residue of a carboxylic acid halide, n is an integer of about 5 to 50 and m is an integer of about 2 to 40, comprising
(i) reacting a dichlorodiphenyl sulfone with excess amount of 2,2-bis-(4-hydroxyphenyl)-propane and in the presence of a base, and
(ii) reacting the product of said (i) with terephthaloyl chloride to produce an ester group-containing polyether sulfone, said excess amount being sufficient to react with said halide to form the corresponding ester, said molecular weight being about 10,000 to 40,000.

* * * * *